(12) United States Patent
Seo et al.

(10) Patent No.: US 7,751,688 B2
(45) Date of Patent: Jul. 6, 2010

(54) METHODS AND APPARATUSES FOR REPRODUCING SUBTITLE STREAMS FROM A RECORDING MEDIUM

(75) Inventors: Kang Soo Seo, Anyang-si (KR); Byung Jin Kim, Seongnam-si (KR); Jea Yong Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 892 days.

(21) Appl. No.: 10/911,731

(22) Filed: Aug. 5, 2004

(65) Prior Publication Data
US 2005/0163475 A1 Jul. 28, 2005

(30) Foreign Application Priority Data
Jan. 6, 2004 (KR) .................... 10-2004-0000633

(51) Int. Cl.
*H04N 5/76* (2006.01)
(52) U.S. Cl. ...................................................... 386/95
(58) Field of Classification Search .................. 386/95, 386/96, 98, 108, E5.025; 348/556, 468, 564, 348/467, 461
See application file for complete search history.

(56) References Cited

U.S. PATENT DOCUMENTS

| 3,128,434 A | 4/1964 | Moreines |
| 5,253,530 A | 10/1993 | Letcher, III |
| 5,467,142 A | 11/1995 | Ichinokawa |
| 5,519,443 A | 5/1996 | Salomon et al. |
| 5,537,151 A * | 7/1996 | Orr et al. ............. 348/564 |
| 5,758,007 A | 5/1998 | Kitamura et al. |
| 5,781,687 A | 7/1998 | Parks |
| 5,832,530 A | 11/1998 | Paknad et al. |
| 5,847,770 A | 12/1998 | Yagasaki |
| 5,987,214 A | 11/1999 | Iwamura |
| 6,009,234 A | 12/1999 | Taira et al. |
| 6,128,434 A | 10/2000 | Hirayama et al. |
| 6,148,140 A | 11/2000 | Okada et al. |
| 6,173,113 B1 | 1/2001 | Okada et al. |
| 6,204,883 B1 | 3/2001 | Tsukagoshi |

(Continued)

FOREIGN PATENT DOCUMENTS

CN 1348588 5/2002

(Continued)

OTHER PUBLICATIONS

Nielsen; "Effective Use of Style Sheets", Dated Jul. 1, 1997.*

(Continued)

*Primary Examiner*—David E Harvey
(74) *Attorney, Agent, or Firm*—Harness, Dickey & Pierce, P.L.C.

(57) ABSTRACT

The recording medium for reproduction of images includes text subtitle streams. At least one of the text subtitle streams includes text data for a text subtitle and a set of style information corresponding to a set of user-selectable styles, respectively. Each style information includes a unique set of display properties required for displaying the text subtitle within a display screen. When one of the set of user-selectable styles is selected by a user, display properties of the text subtitle within the display screen are automatically changed to the selected style.

33 Claims, 10 Drawing Sheets

U.S. PATENT DOCUMENTS

| | | | |
|---|---|---|---|
| 6,219,043 B1 | 4/2001 | Yogeshwar et al. | |
| 6,222,532 B1 | 4/2001 | Ceccarelli | |
| 6,230,295 B1 * | 5/2001 | Watkins | 714/742 |
| 6,253,221 B1 | 6/2001 | Kim | |
| 6,262,775 B1 | 7/2001 | Kim | |
| 6,297,797 B1 | 10/2001 | Takeuchi et al. | |
| 6,320,621 B1 | 11/2001 | Fu | |
| 6,393,196 B1 | 5/2002 | Yamane et al. | |
| 6,597,861 B1 | 7/2003 | Tozaki et al. | |
| 6,661,467 B1 | 12/2003 | Van Der Meer et al. | |
| 6,727,902 B2 | 4/2004 | Tournier | |
| 6,744,998 B2 | 6/2004 | McIntyre | |
| 6,747,920 B2 | 6/2004 | Denda et al. | |
| 6,792,577 B1 | 9/2004 | Kimoto | |
| 7,134,074 B2 | 11/2006 | Munetsugu et al. | |
| 7,151,617 B2 | 12/2006 | Fukushima et al. | |
| 7,174,560 B1 | 2/2007 | Crinon | |
| 7,188,353 B1 | 3/2007 | Crinon | |
| 7,330,643 B2 | 2/2008 | Sawabe et al. | |
| 7,370,274 B1 | 5/2008 | Stuple et al. | |
| 7,502,549 B2 | 3/2009 | Suzuki | |
| 7,526,718 B2 | 4/2009 | Samadani et al. | |
| 2001/0044809 A1 | 11/2001 | Parasnis et al. | |
| 2002/0004755 A1 | 1/2002 | Balthaser | |
| 2002/0010924 A1 | 1/2002 | Kalhour | |
| 2002/0106193 A1 | 8/2002 | Park et al. | |
| 2002/0135607 A1 | 9/2002 | Kato et al. | |
| 2002/0135608 A1 | 9/2002 | Hamada et al. | |
| 2002/0151992 A1 | 10/2002 | Hoffberg et al. | |
| 2002/0159757 A1 | 10/2002 | Ando et al. | |
| 2002/0194618 A1 | 12/2002 | Okada et al. | |
| 2003/0039472 A1 | 2/2003 | Kim | |
| 2003/0078858 A1 | 4/2003 | Angelopoulos et al. | |
| 2003/0085997 A1 | 5/2003 | Takagi et al. | |
| 2003/0086690 A1 | 5/2003 | Chung et al. | |
| 2003/0099464 A1 | 5/2003 | Oh et al. | |
| 2003/0103604 A1 | 6/2003 | Kato et al. | |
| 2003/0123845 A1 | 7/2003 | Koda et al. | |
| 2003/0147629 A1 | 8/2003 | Kikuchi et al. | |
| 2003/0188312 A1 | 10/2003 | Bae et al. | |
| 2003/0189571 A1 | 10/2003 | MacInnis et al. | |
| 2003/0189669 A1 * | 10/2003 | Bowser | 348/564 |
| 2003/0190147 A1 | 10/2003 | Lee | |
| 2003/0194211 A1 | 10/2003 | Abecassis | |
| 2003/0202431 A1 | 10/2003 | Kim et al. | |
| 2003/0206553 A1 | 11/2003 | Surcouf et al. | |
| 2003/0206727 A1 | 11/2003 | Sawabe et al. | |
| 2003/0216922 A1 | 11/2003 | Gonzales et al. | |
| 2003/0235402 A1 | 12/2003 | Seo et al. | |
| 2003/0235404 A1 | 12/2003 | Seo et al. | |
| 2003/0235406 A1 | 12/2003 | Seo et al. | |
| 2004/0001699 A1 | 1/2004 | Seo et al. | |
| 2004/0003347 A1 | 1/2004 | Saidenberg et al. | |
| 2004/0027369 A1 | 2/2004 | Kellock et al. | |
| 2004/0047591 A1 | 3/2004 | Seo et al. | |
| 2004/0047592 A1 | 3/2004 | Seo et al. | |
| 2004/0047605 A1 | 3/2004 | Seo et al. | |
| 2004/0054771 A1 | 3/2004 | Roe et al. | |
| 2004/0081434 A1 * | 4/2004 | Jung et al. | 386/95 |
| 2004/0151472 A1 | 8/2004 | Seo et al. | |
| 2004/0184785 A1 | 9/2004 | Steyer et al. | |
| 2004/0202454 A1 | 10/2004 | Kim et al. | |
| 2004/0252234 A1 * | 12/2004 | Park | 348/468 |
| 2005/0013207 A1 | 1/2005 | Tsumagari et al. | |
| 2005/0105888 A1 | 5/2005 | Hamada et al. | |
| 2005/0147387 A1 | 7/2005 | Seo et al. | |
| 2006/0013563 A1 * | 1/2006 | Adolph et al. | 386/95 |
| 2006/0098936 A1 | 5/2006 | Ikeda et al. | |
| 2006/0156358 A1 | 7/2006 | Adolph et al. | |
| 2006/0259941 A1 | 11/2006 | Goldberg et al. | |

FOREIGN PATENT DOCUMENTS

| | | |
|---|---|---|
| CN | 1359521 | 7/2002 |
| CN | 1368732 | 9/2002 |
| CN | 1418427 | 5/2003 |
| CN | 1864220 | 11/2006 |
| EP | 0737016 | 4/1996 |
| EP | 0863509 | * 9/1998 |
| EP | 0971536 | 9/2001 |
| EP | 0755161 | 10/2001 |
| EP | 1178691 | 2/2002 |
| EP | 1 198 132 | 4/2002 |
| EP | 1 229 542 | 8/2002 |
| EP | 1326451 | 7/2003 |
| EP | 1 408 505 | 4/2004 |
| EP | 1521463 | 4/2005 |
| GB | 1586431 | 3/1981 |
| JP | 09-102940 | 4/1997 |
| JP | 11-252518 | 9/1999 |
| JP | 2000-324395 | 11/2000 |
| JP | 2002-290895 | 10/2002 |
| JP | 2003-61098 A | 2/2003 |
| JP | 2003-224826 A | 8/2003 |
| JP | 2003-230136 A | 8/2003 |
| KR | 1020010001725 | 1/2001 |
| KR | 1020020043812 | 6/2002 |
| KR | 1020030030554 | 4/2003 |
| RU | 2129758 | 4/1999 |
| RU | 2181929 | 4/2002 |
| RU | 96101175 | 5/2004 |
| TW | 578068 | 3/2004 |
| TW | 200407812 | 5/2004 |
| WO | WO 00/28518 | 5/2000 |
| WO | WO 03/056560 | 7/2003 |
| WO | WO 03/105152 | 12/2003 |
| WO | WO 2004/036574 | 4/2004 |
| WO | WO 2005/034122 | 4/2005 |
| WO | WO 2005/045833 | 5/2005 |
| WO | WO 2005/045835 | 5/2005 |
| WO | WO 2005/074394 | 8/2005 |
| WO | WO 2005/079171 A2 | 9/2005 |
| WO | WO 2005/083708 A1 | 9/2005 |

OTHER PUBLICATIONS

International Search Report dated Nov. 30, 2004.
Feb. 2003, XP007902747, http://msdn2.micorsoft.com/en-us/library/ms971327(d=printer).aspx>.
European Search Report dated Aug. 23, 2007.
Feb. 2003, XP007902747, <http://msdn2.micorsoft.com/en-us/library/ms971327(d=printer).aspx>.
U.S. Patent Office Action dated Apr. 29, 2008, for corresponding U.S. Appl. No. 11/069,959.
U.S. Patent Office Action dated Apr. 14, 2008, for corresponding U.S. Appl. No. 11/033,109.
U.S. Patent Office Action dated May 14, 2008, for corresponding U.S. Appl. No. 11/022,759.
Taiwan Patent Office Action dated Apr. 30, 2008, for corresponding Taiwanese Patent Application No. 093133428 (English translation provided).
Office Action corresponding to Chinese Application No. 200480039874.2 dated Sep. 26, 2008.
Malaysian Office Action dated Nov. 14, 2008.
Russian Office Action corresponding to Russian Application No. 2006128572/28 dated Jan. 23, 2009.
Russian Office Action corresponding to Russian Application No. 2006132342/28 dated Jan. 23, 2009.
Office Action corresponding European Application No. 05 721 895.0-2223 dated Apr. 9, 2009.

Notice of Allowance dated Mar. 31, 2009 by the Russian Patent Office for counterpart Russian Patent Office Application No. 2006132328/28(035162).

European Office Action dated Jun. 12, 2009, for counterpart Application No. 04808336.4—2223.

"Digital Video Broadcasting (DVB); Subtitling Systems" ETSI EN 300 743 V1.2.1, [Online] Jun. 2002, pp. 1-48.

"Adding a Captain Track in QuickTime," Dec. 23, 2003, pp. 1-6.

European Search Report dated Jun. 30, 2009.

Office Action for corresponding Chinese Application No. 200580004498.8 dated Jul. 24, 2009.

Decision on Grant for corresponding Russian Application No. 2006132346 dated Jun. 18, 2009.

Decision on Grant for corresponding Russian Application No. 2006132373 dated Jun. 18, 2009.

U.S. Office Action for U.S. Appl. No. 10/986,998 dated Aug. 4, 2009.

Office Action dated Aug. 21, 2009 by the European Patent Office for a counterpart European application.

Notice of Allowance dated Jul. 28, 2009 by the Russian Patent Office for a counterpart Russian application.

European Search Report dated October 21, 2009.

U.S. Office Action dated Jan. 11, 2010.

U.S. Office Action dated Jan. 20, 2010.

Understanding SAMI 1.0 by Microsoft Corporation, Oct. 2001.

U.S. Notice of Allowance dated Feb. 4, 2010.

European Search Report dated Feb. 8, 2010.

European Search Report dated Aug. 14, 2009 for Application No. 04 800 086.3.

U.S. Office Action for U.S. Appl. No. 11/633,027 dated Aug. 18, 2009.

\* cited by examiner

| Effect or Function | Author | User | |
|---|---|---|---|
| Fade-in/out | 0 | x | |
| Change position | 0 | 0 | ←--- Text region should be limited within picture |
| Scrolling | 0 | x | |
| Font size | 0 | 0 | ←--- Text region should be limited within picture |
| Font color | 0 | x | |
| Font type (Gothic, ...) | 0 | x | |
| Font style (Bold, ...) | 0 | x | |
| Background color | 0 | x | |
| Text flow (↓/→) | 0 | x | |
| Text alignment | 0 | x | |
| Line space | 0 | x | |

METHODS AND APPARATUSES FOR REPRODUCING SUBTITLE STREAMS FROM A RECORDING MEDIUM

This application claims the benefit of Korean Patent Application No. 10-2004-0000633, filed on Jan. 6, 2004, which is hereby incorporated by reference.

BACKGROUND OF THE INVENTION

1. Field of the Invention

The present invention relates to a recording medium having at least one text subtitle stream for reproduction of images recorded thereon as well as methods and apparatuses for reproduction and recording.

2. Discussion of the Related Art

Optical discs are widely used as an optical recording medium for recording mass data. Presently, among a wide range of optical discs, a new high density optical recording medium (HD-DVD), such as the Blu-ray Disc (hereafter referred to as "BD"), is under development for writing and storing high definition video and audio data for a long period of time.

Currently, global standard technical specifications of the Blu-ray Disc (BD), which is known to be the next generation HD-DVD technology, are under establishment as a next generation optical recording solution that is able to have data significantly surpassing the conventional DVD, along with many other digital apparatuses. Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus.

Most particularly, in order to effectively reproduce the data from the Blu-ray Disc (BD), not only information on a structural data file of the data recorded in the Blu-ray Disc (BD), but also information for effectively forming and managing the data file should be systemized and provided. However, in the present Blu-ray Disc (BD) standards, since the standards of the auxiliary data, particularly the subtitle information, are not completely consolidated, there are many restrictions in the full-scale development of a Blu-ray Disc (BD) basis optical reproducing apparatus. And, such restrictions cause problems in reproducing the data stream and providing the data stream to the user.

SUMMARY OF THE INVENTION

Accordingly, the present invention is directed to a recording medium and methods and apparatuses for reproduction and recording that substantially obviate one or more problems due to limitations and disadvantages of the related art.

An object of the present invention is to provide a recording medium, enabling a user to select one of a plurality of user-selectable styles when displaying a subtitle on a display screen.

Another object of the present invention is to provide an apparatus and method of reproducing data streams recorded on a recording medium, enabling a user to select one of a plurality of user-selectable styles when displaying a subtitle on a display screen.

A further object of the present invention is to provide an apparatus and method of recording data streams on a recording medium, enabling a user to select one of a plurality of user-selectable styles when displaying a subtitle on a display screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium for reproduction of images includes a first data field storing at least one text subtitle stream. The text subtitle stream includes text data for a text subtitle and a set of style information corresponding to a set of user-selectable styles, respectively. Each style information includes a unique set of display properties required for displaying the text subtitle within a display screen. The unique set of display properties includes at least one of a horizontal position, a vertical position, and a font size of the text subtitle within the display screen.

In another aspect of the present invention, a method of recording data streams for reproduction of images on a recording medium includes the step of recording at least one text subtitle stream on the recording medium. The text subtitle stream includes text data for a text subtitle and a set of style information corresponding to a set of user-selectable styles, respectively. Each style information includes a unique set of display properties required for displaying the text subtitle within a display screen.

In another aspect of the present invention, a method of reproducing data streams for reproduction of images recorded on a recording medium includes the step of reading at least one text subtitle stream from the recording medium. The text subtitle stream includes text data for a text subtitle and a set of style information corresponding to a set of user-selectable styles, respectively. Each style information includes a unique set of display properties required for displaying the text subtitle within a display screen.

In another aspect of the present invention, an apparatus for recording data streams for reproduction of images on a recording medium includes a driver for driving an optical recording device to record data on the recording medium, and a microprocessor coupled to the driver. The microprocessor controls operation of the driver to record at least one subtitle stream on the recording medium. The text subtitle stream includes text data for a text subtitle and a set of style information corresponding to a set of user-selectable styles, respectively. Each style information includes a unique set of display properties required for displaying the text subtitle within a display screen.

In a further aspect of the present invention, an apparatus for reproducing data streams of images recorded on a recording medium includes a driver for driving an optical reproducing device to reproduce data recorded on the recording medium, and a microprocessor coupled to driver. The microprocessor controls operation of the driver to reproduce at least one text subtitle stream recorded in the recording medium. The text subtitle stream includes text data for a text subtitle and a set of style information corresponding to a set of user-selectable styles, respectively. Each style information includes a unique set of display properties required for displaying the text subtitle within a display screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
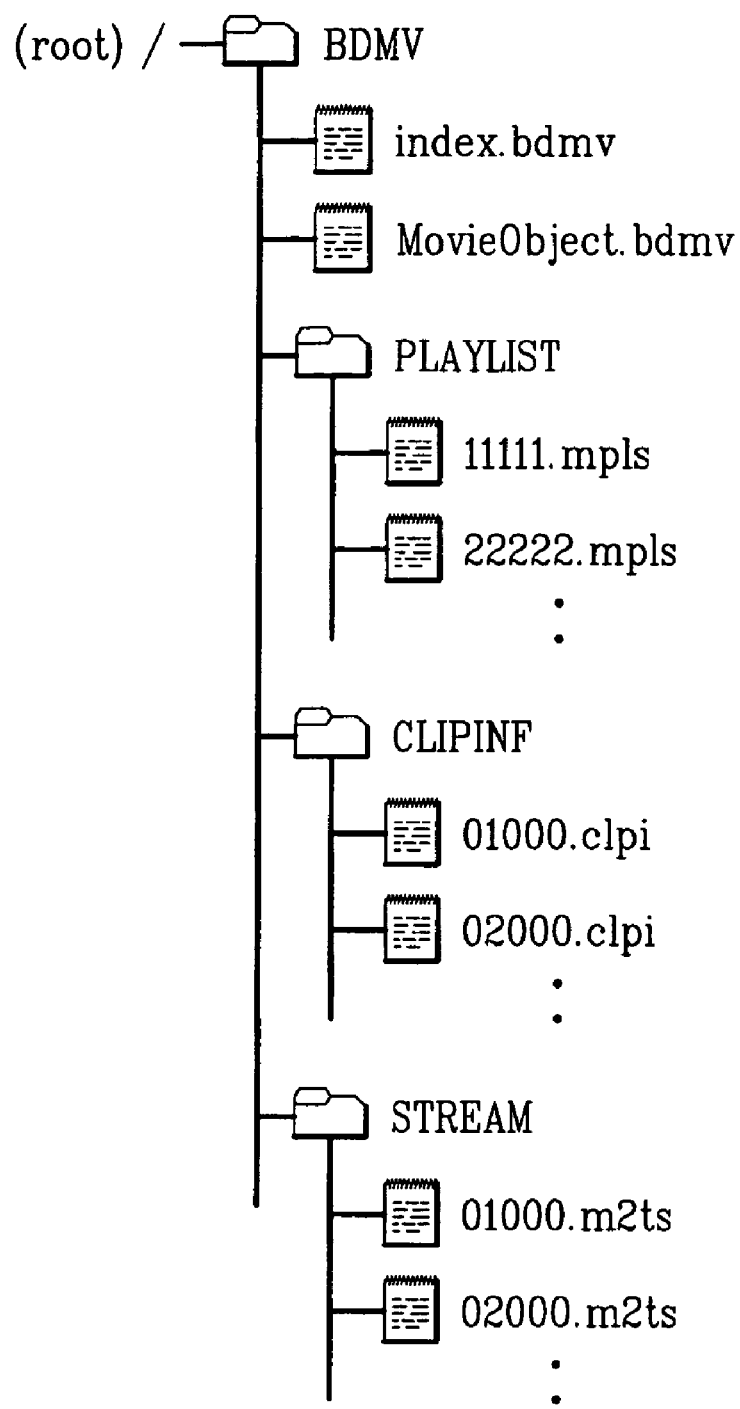
FIG. 1 illustrates the structure of the files that manage data recorded in an optical disc according to the present invention.

FIG. 1 illustrates data files for reproduction of images recorded in a Blue-ray (BD) disc according to the present invention. Referring to FIG. 1, at least one BD directory (BDMV) is included in a root directory (root). Each BD directory includes an index file (index.bdmv) and an object file (MovieObject.bdmv), which represent general files that are used to interact with one or more users. Each BD directory further includes three additional file directories that include information required for reproducing the data recorded in the disc. For example, the index file contains an index table which includes information regarding a plurality of selectable menus and titles.

The file directories included in each BD directory are a stream directory (STREAM), a play-list directory (PLAYLIST), and a clip information directory (CLIPINF). The stream directory includes video and audio (AV) stream files having a particular format. For example, the AV stream files may be in the format of MPEG2 transport packets, which are often named as "*.m2ts" as shown in FIG. 1. In addition, the AV stream files included in STREAM are also called clip stream files in the BD industry standards.

The stream directory further includes at least one subtitle stream, which includes text data for a text subtitle and a set of style information corresponding to a set of user-selectable styles, respectively, may be multiplexed with the AV stream files within the stream directory, or it could exist as independent files within the same directory (STREAM). In the latter case, such independent files may be named as "*.tst". Each style information includes a unique set of display properties required for displaying the text subtitle within a display screen, and the unique set of display properties included in each style information includes at least one of a horizontal position, a vertical position, and a font size of the text subtitle within the display screen. The text subtitle further includes style information corresponding to a default style. This default style information includes a default set of display properties required when initially displaying the text subtitle within the display screen by default. More details to these will be explained later with reference to FIG. 6.

Next, the clip information directory (CLIPINF) includes clip information files (e.g., 01000.clpi and 02000.clpi shown in FIG. 1) that correspond to the AV stream files, respectively. Each clip information file includes property and timing information of a corresponding AV stream file, where the timing information includes information that maps Presentation Time Stamp (PTS) with Source Packet Number (SPN) using Entry Point Map. In the industry standards, each pair of an AV stream file and its corresponding clip information file is often designated as "a clip". For example, 01000.clpi included in CLIPINF includes property information and timing information of 01000.m2ts included in STREAM, and the pair of 01000.clpi and 01000.m2ts forms a clip.

Referring back to FIG. 1, the play-list directory (PLAYLIST) includes one or more play-list files (*.mpls), where each play-list file includes at least one play-item which designates the time for play-back of a clip. A play-item includes information designating beginning and ending times (In-Time and Out-Time) for play-back of a clip, which is designated by "Clip_Information_File_Name" within the play-item. Therefore, a play-list file represents basic information required for play-back of one or more clips designated by a combination of play-items. In addition, the play-list file may further include one or more sub-play-items, which may or may not be synchronized with the play-items within the play-list file.

According to the present invention, a subtitle represents caption information of images represented in a predetermined language. For example, when a user selects one of available subtitles while viewing images on a display screen, corresponding caption information is displayed on a predetermined portion of the display screen. When a subtitle is text information, the subtitle is called a text subtitle. One of the essential features of the present invention is to allow one or more users to change display properties of a subtitle when playing-back AV streams prerecorded in a high-density optical disc. More details to such change in display properties of the subtitle will be described later in this section.

Figure 2:
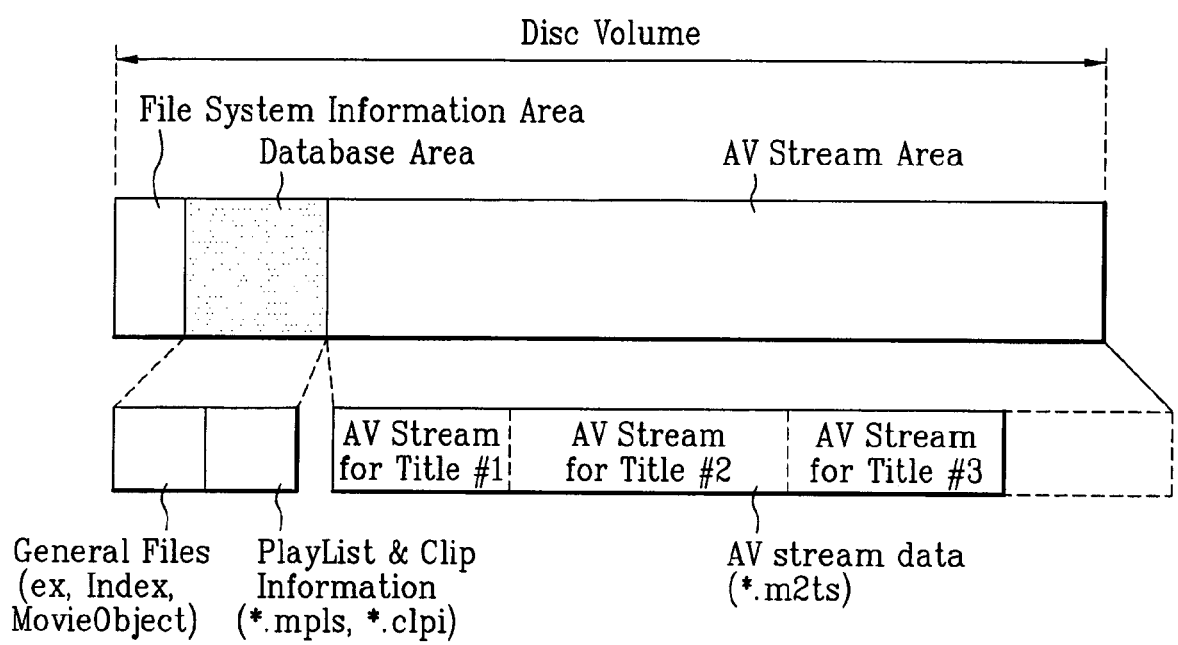
FIG. 2 illustrates data storage areas of an optical disc volume according to the present invention.

FIG. 2 illustrates data storage areas of an optical disc volume, in which the data files shown in FIG. 1 are prerecorded. As shown in the figure, the disc volume includes a file system information area occupying the inmost portion of the disc volume, an AV stream area occupying the outmost portion of the disc volume, and a database area between the file system information area and the AV stream area. In file system information area system information that manages the entire data files is prerecorded. Next, audio-video data (AV streams) and at least one subtitle stream are prerecorded in the AV stream area. The general files, play-list files, and clip-information files are prerecorded in the database area of the disc volume. As discussed above, the general files include index and object files, and the play-list files and clip-information files include information required for play-back of the AV streams prerecorded in the AV stream area. A user is able to select a specific play-back mode and to play-back desired AV streams in the selected play-back mode using the information stored in the database area.

Figures 3A, 3B:
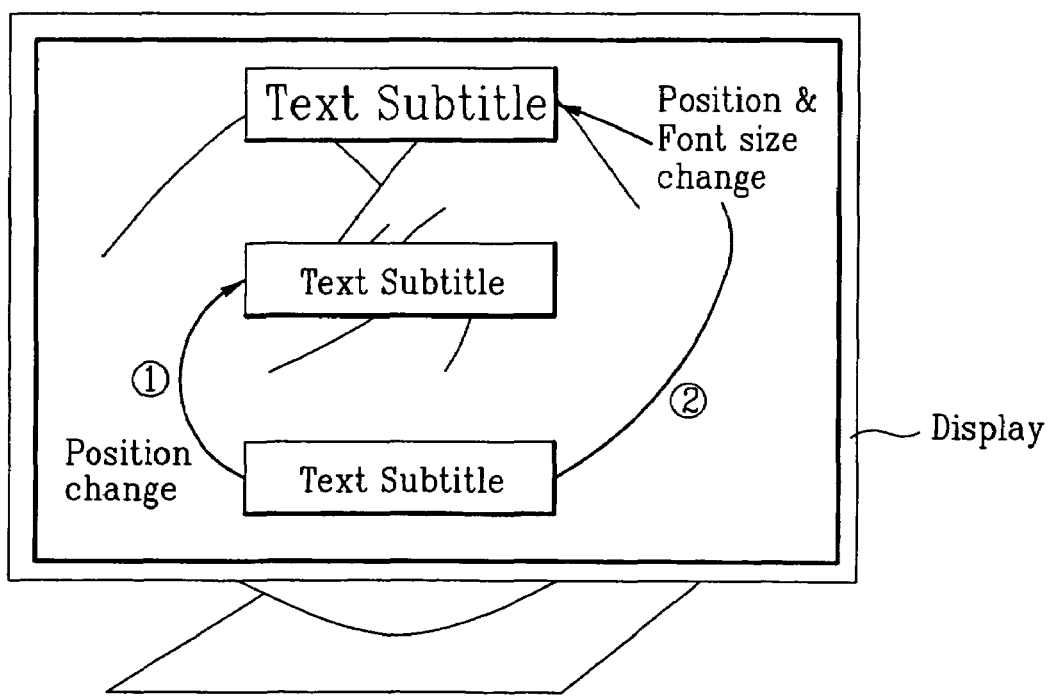
FIG. 3A illustrates a table indicating subtitle display functions that are controllable by a user according to the present invention.
FIG. 3B illustrates the fundamental concepts of changing the position and font size of a subtitle according to the present invention.

FIG. 3A illustrates a table indicating subtitle display properties (display functions) selected to be controlled by a user according to the present invention. Referring to FIG. 3A, a list of subtitle display properties include fade-in or fade-out, change position, scrolling, font size, font color, font type (e.g., Gothic and etc.), font style (e.g., Bold and etc.), background color, text flow, text alignment, and line space functions. Basically, all the subtitle display properties listed in FIG. 3A are changeable by an author (who records data in a disc), and they are then classified into user-changeable and user-unchangeable display properties.

According to the present invention, the user-changeable subtitle display properties are limited to at least one of a position and a font size of a subtitle. The position and font size of a subtitle significantly affect the user's view of the images on a display screen. Therefore, it would be very convenient for any user to be able to change the position and the font size of the subtitle. Any change of other subtitle display properties such as scrolling and font color parameters may rather seriously impair the display quality of the whole images being displayed.

However, the user's control of the position and font size of the subtitle may be limited during a specified play-back time by limiting the user operation (UO). One of the main reasons for limiting the user's control is that the position and font size of the subtitles may not be properly changed when playing-back a certain type of AV streams. The information allowing or limiting the user's control of the position and font size of the subtitles is included in the disc, and more details to this will be described later with reference to FIG. 8A.

In addition, changes of the position and font size of the subtitle must be within the permitted ranges. For example, the position and font size of the subtitles must be limited such that the displayed subtitle must be within a predefined area within a display screen. In another example, the font size must be chosen such that the entire texts are included within a subtitle area of the screen. The permitted ranges of the position and font size of the subtitles can be predefined by the author and be stored in the disc, or they can be manually set and be changed by a user.

FIG. 3B illustrates the fundamental concepts of changing the position and font size of the subtitles according to the present invention. The first example illustrated in FIG. 3B shows the change of the position of the subtitle only, but both of the position and font size are changed in the second example. Although it is not illustrated in FIG. 3B, it is also possible to change the font size of the subtitle without changing the subtitle position. As explained earlier, the changes of the position and/or font size of the subtitle must be limited such that the changes are within permitted ranges.

Figure 4A:
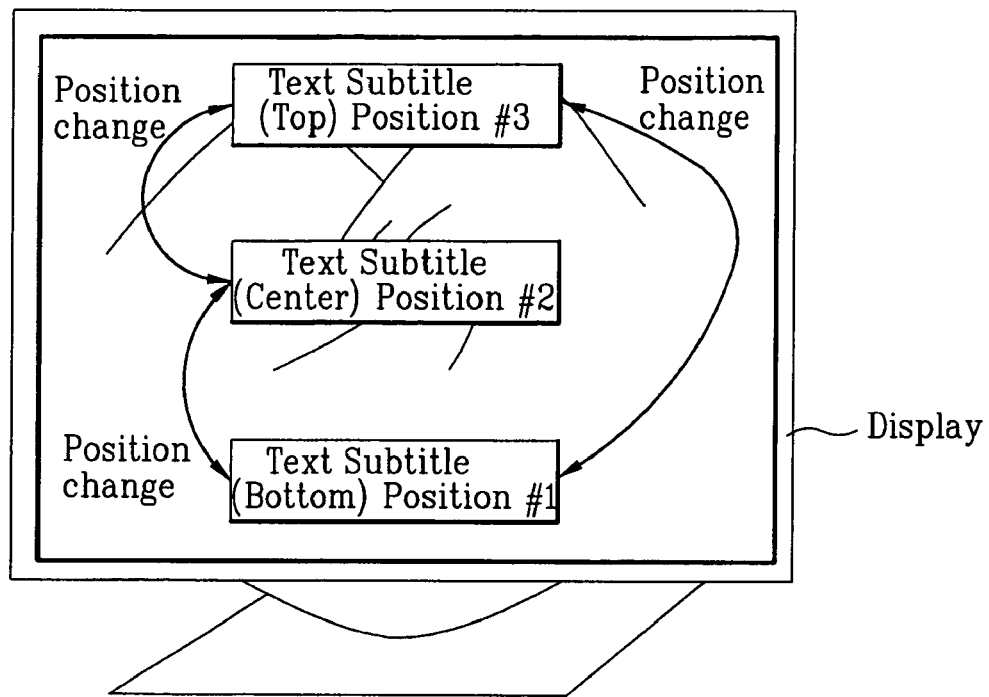
FIGS. 4A to 4C illustrate various examples of changing the position and font size of a subtitle according to the present invention.
Figure 4B:
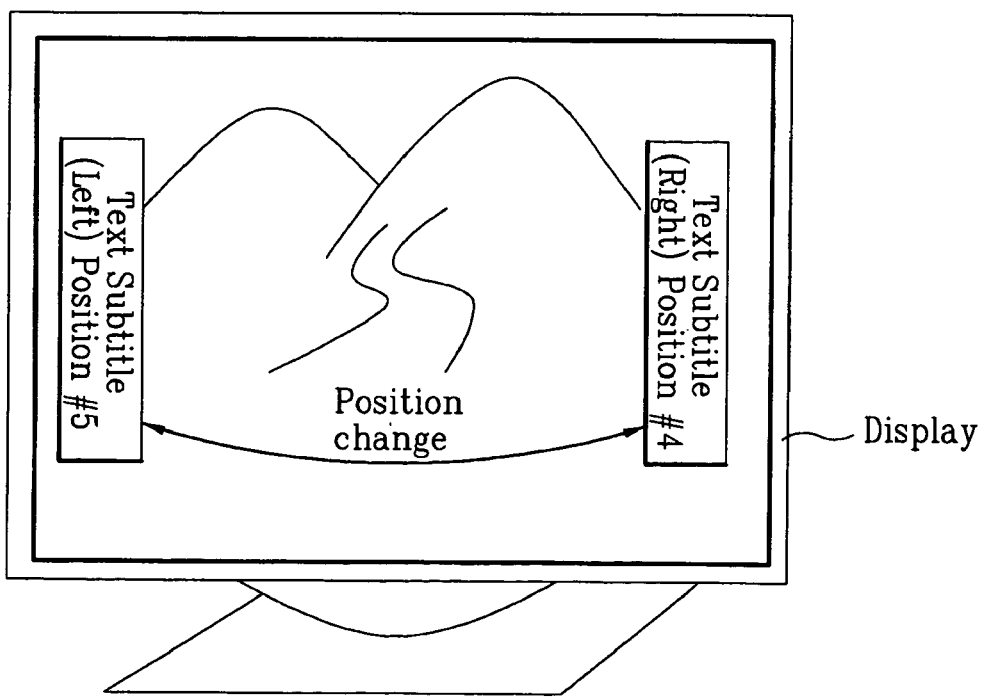
Figure 4C:
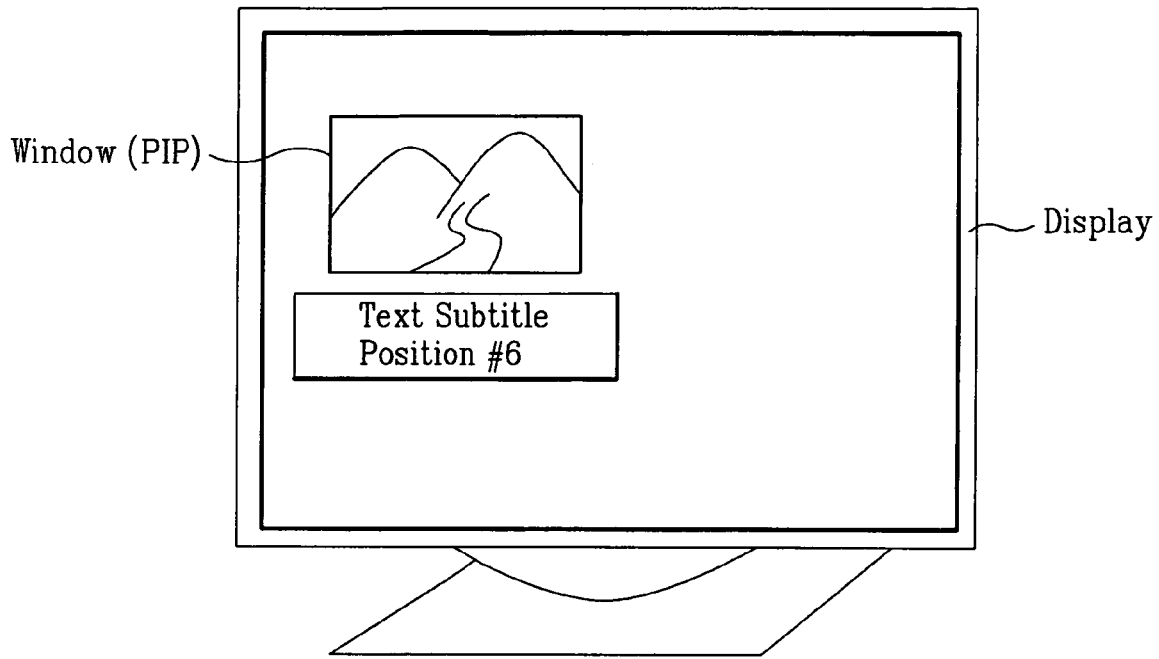

FIGS. 4A to 4C illustrate various examples of changing the position of a subtitle according to the present invention. Referring to FIG. 4A, the predefined positions of a subtitle are bottom position (position No. 1), center position (position No. 2), and top position (position No. 3) within a display screen. The position of the subtitle may be changed between the predefined positions when a request is made by a user. Referring to FIG. 4B, the predefined positions of a subtitle are right position (position No. 4) and left position (position No. 5). Similarly, the position of the subtitle shown in FIG. 4B may be changed between the predefined positions each time a request is made by a user.

Reference will now be made in detail to some of the specific methods of changing the subtitle position within an effective area of a display screen. In one method, information indicating a set of predefined positions of a subtitle such as those shown in FIGS. 4A and 4B may be prestored within a disc. Each time a request for changing the subtitle position (e.g., selection of a menu option) is made by a user, the subtitle, which is initially positioned at an initial position (default position), is moved between the predefined positions in a predefined order. The initial position may or may not be any one of the predefined positions. For example, a subtitle may move in the order of the bottom position (position No. 1), center position (position No. 2), top position (position No. 3), right position (position No. 4), and left position (position No. 5). Considering the order of the positions preferred by many users in general, the subtitle may also move in the order of the bottom position (position No. 1), top position (position No. 3), right position (position No. 4), left position (position No. 5), and center position (position No. 2). The number of the predefined positions described above may be predefined by defining the maximum number of the predefined positions, which will be described in more detail later with reference to FIG. 8B.

In another method of changing the subtitle position within the display screen, a desired position of a subtitle may be manually selected by a user by using a user interface unit, examples of which are a mouse, a remote control, and a control panel provided at a display device. For example, the user may manually select his or her desired subtitle position by using a cursor which may be controlled by the user interface unit. Alternatively, the user may input coordinate information of a desired subtitle position by pressing the button keys included in the user interface unit.

FIG. 4C illustrates another example of changing the position of a subtitle according to the present invention, where the subtitle is for images displayed in a window (e.g., a picture-in-picture window), which occupies only a portion of the display screen. In this case, the subtitle is displayed at a position outside of the window (e.g., position No. 6 shown in FIG. 4C) but within an effective area of the display screen. The specific methods of changing the subtitle position described above with reference to FIG. 4A and FIG. 4B are also applicable in this case.

Figure 5:
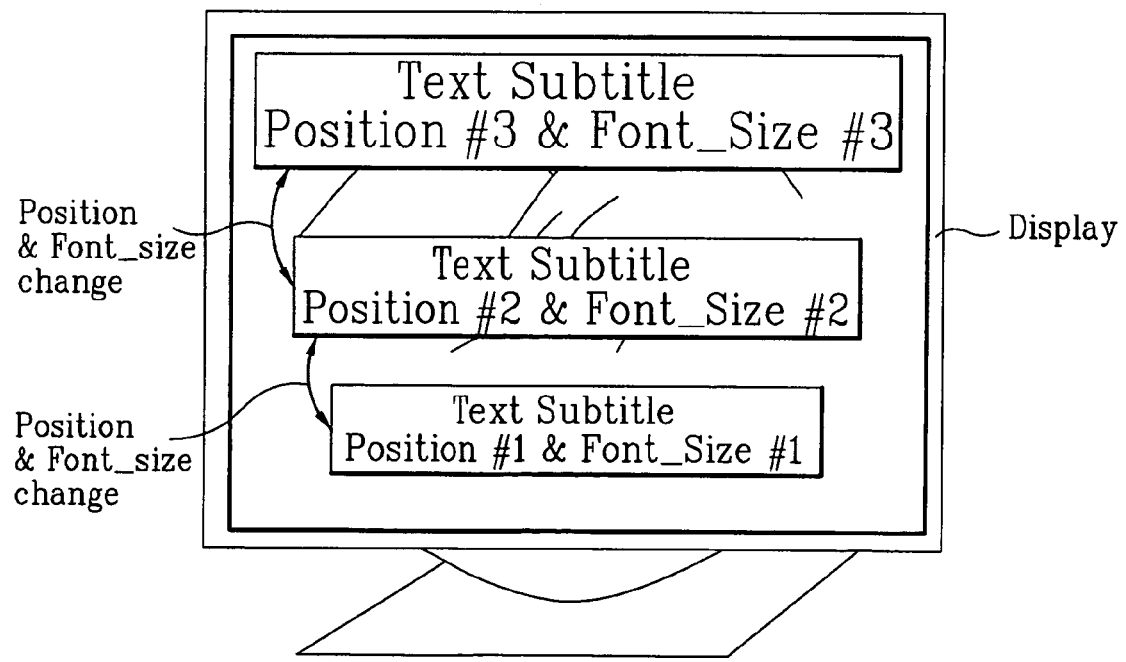
FIG. 5 illustrates an example of changing the position and font size of a subtitle according to the present invention.

FIG. 5 illustrates an example of changing the position and font size of a subtitle at the same time according to the present invention. In one method, information indicating a set of predefined font sizes (font_size No. 1, font_size No. 2, and font_size No. 3) and a set of predefined positions (position No. 1, position No. 2, and position No. 3), such as those shown in FIG. 5, may be prestored in a disc. Each time a request for changing display setting of the subtitle (e.g., selection of a menu operation) is made by a user, the font size of a subtitle, which is initially displayed at a default font size, is changed between the predefined font sizes in a predefined order. At same time, the subtitle, which is initially positioned at a default position, is also moved between the predefined positions in a predefined order. For example, the font size of the subtitle may change in the order of font_size No. 1, font_size No. 2, and font_size No. 3, and the position may change in the order of position No. 1, position No. 2, and position No. 3, as shown in FIG. 5.

In another method, a desired font size and position of a subtitle may be manually selected by a user using a user interface unit (e.g., a remote control and a control panel provided at a display device). For example, the user may manually enter a desired font size and position by using the user interface unit. The number of the predefined positions and font sizes may be predefined by the user by defining the maximum number of positions and the maximum number of font sizes, which will be described in more detail later with reference to FIG. 8B.

Figure 6:
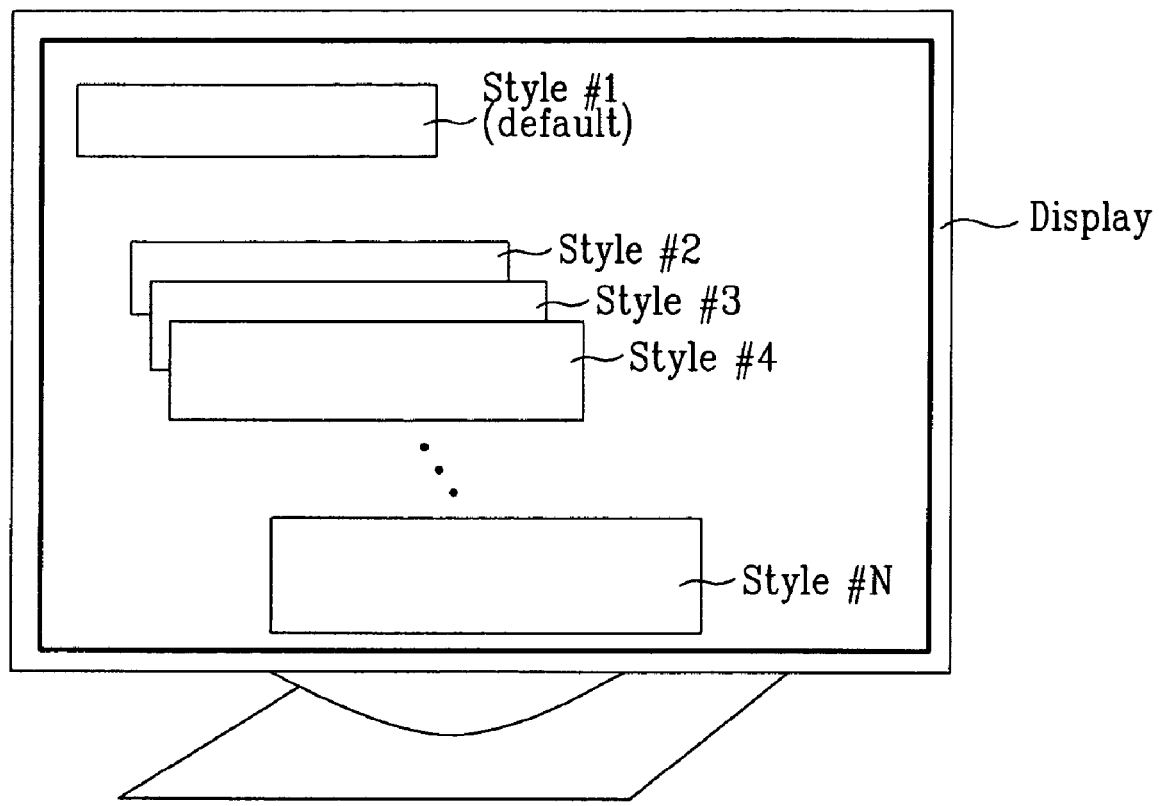
FIG. 6 illustrates an example of changing the position and font size of a subtitle at the same time according to the present invention.

FIG. 6 illustrates an example of changing the style of a subtitle according to the present invention. A set of a position and a font size of a text subtitle are defined as a style, and a subtitle is initially displayed at a default style (e.g., style No. 1 shown in FIG. 6) when the subtitle streams recorded in a disc are preloaded by a disc player. The default style represents a set of a default position and font size previously determined by an author of the disc, and the information indicating the default style is recorded in the disc.

In one specific method of changing the subtitle style according to the present invention, style information indicating a set of predefined user-selectable styles (e.g., Styles No. 2 to N shown in FIG. 6) are stored in an optical disc. When a user selects one of the set of user-selectable styles, the position and font size of the subtitle automatically change to particular position and font size that correspond to the selected style. Alternatively, each time a request for changing the subtitle style (e.g., selection of a menu option) is made by a user, the position and font size of a subtitle is changed between the set of predefined styles in a predefined order. For example, the position and font size of a subtitle may change in the order of style No. 2, style No. 3, style No. 4, . . . , and style No. N, as shown in FIG. 6.

In another method, a desired style representing a desired position and font size may be manually defined by a user using a user interface unit as described above in detail. In both methods, the number of user-selectable styles may be limited by defining the maximum number of the styles, which will be described in detail later in this section with reference to FIG. 8B.

Figure 7:
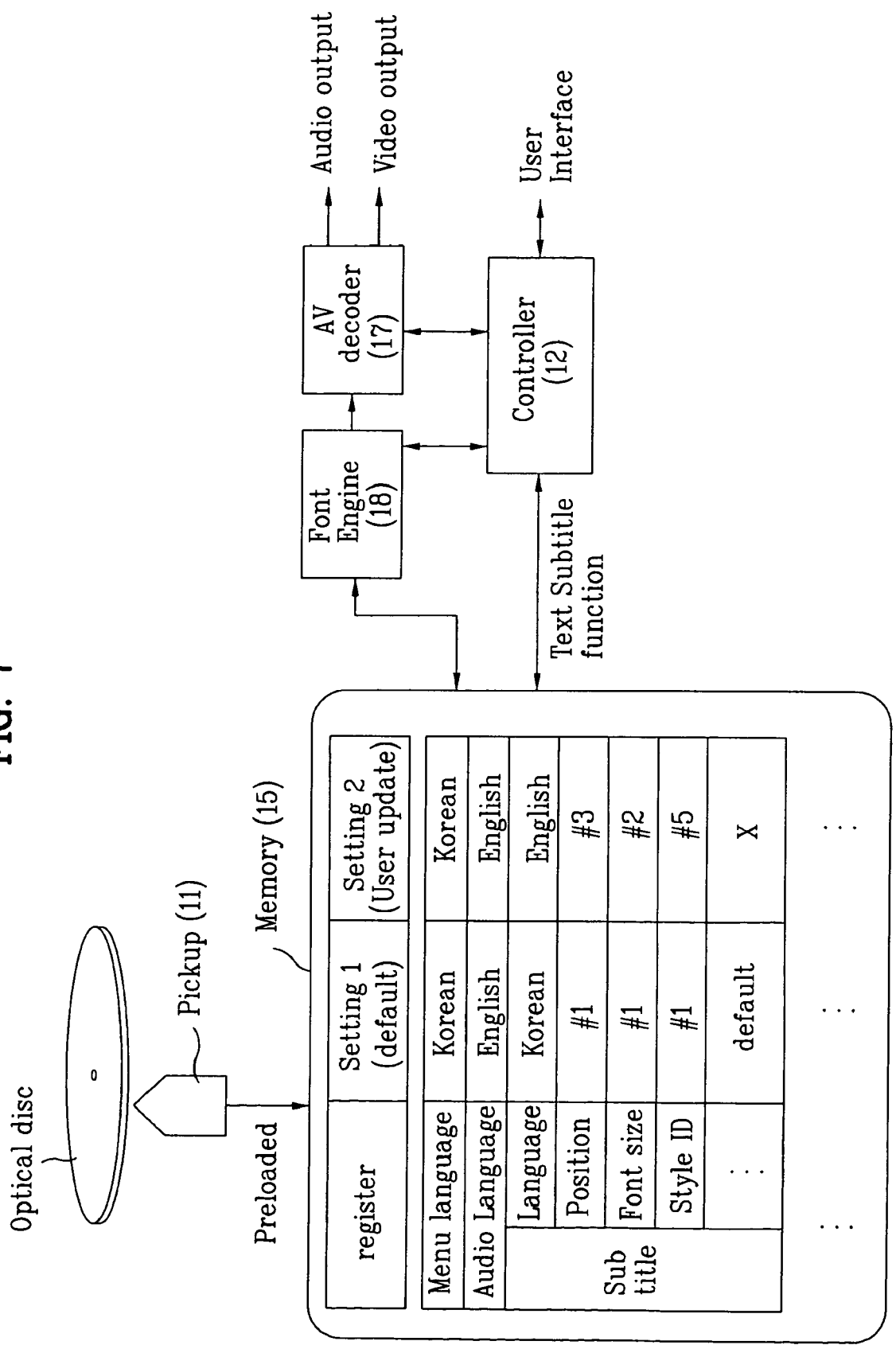
FIG. 7 illustrates an apparatus of reproducing data streams recorded in an optical disc according to the present invention.

FIG. 7 illustrates an apparatus of reproducing data streams for reproduction of images recorded in an optical disc according to the present invention. When the optical disc is preloaded, AV streams and at least one subtitle text stream are read from the optical disc. The subtitle stream includes text data for a text subtitle, and display information indicating various display property values set by default for initially displaying the subtitle within a display screen. These display property values set by default include menu language, audio language, subtitle language, subtitle position, subtitle font size, and style. The memory 15 initially stores the style identification of the default style and all other display properties in corresponding registers.

The subtitle stream further includes a set of style information corresponding to a set of user-selectable styles. When a user selects one of the user-selectable styles, the memory 15 stores the style identification of the selected style is stored in a corresponding register.

For example, the default subtitle position, font size, and style values preloaded from the optical disc are position No. 1, font size No. 1, and style No. 1, and these values are stored in their corresponding registers within the memory 15. In addition, the memory 15 also includes registers for storing user-updated display information when a request for changing the subtitle setting is received. For example, the user-updated subtitle position, font size, and style values are position No. 3, font size No. 2, and style No. 5, and these values are stored in corresponding registers within the memory 15. The updated subtitle setting information are used in the font engine 18 and the AV decoder 17 when playing-back the preloaded subtitle data on a display screen, and these operations are controlled by a controller 12. The memory 15 may be any one of various storages including a RAM and a buffer, all of which could be easily equipped within the disc player.

Figure 8A:
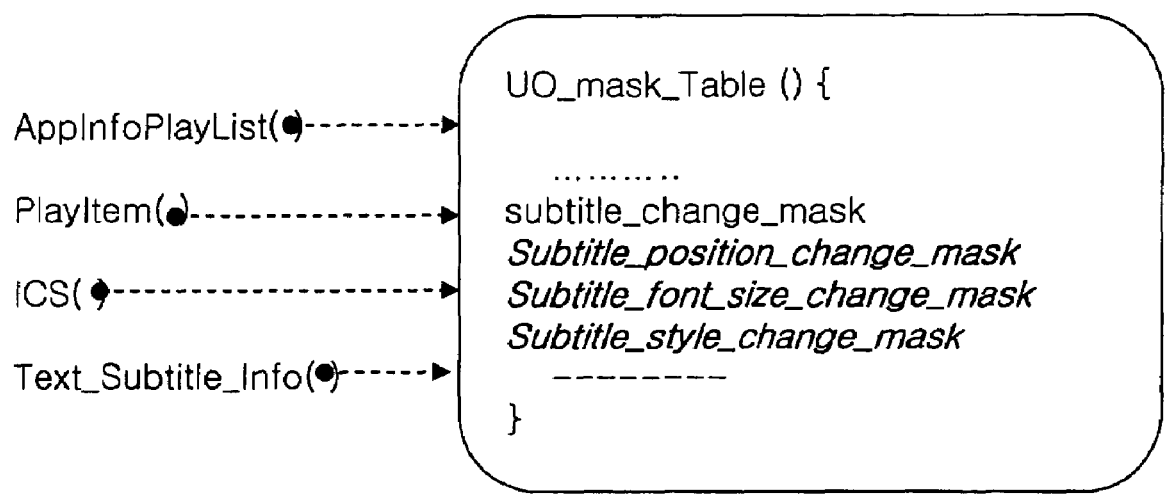
FIG. 8A illustrates a user operation mask table stored in an optical disc according to the present invention.

FIG. 8A illustrates a user operation mask table stored in an optical disc according to the present invention. The information included in the table indicates whether to allow a user to change the subtitle setting. The user operation mask table (UO_mask_Table) shown in FIG. 8A may be included in any one of AppInfoPlayList ( ), PlayItem ( ), ICS ( ), TextSubtitleInfo ( ) of the play-list files, respectively. Herein, the user operation mask table includes subtitle_position_change_mask field indicating whether to allow changes of the subtitle position, subtitle_font_size_change_mask field indicating whether to allow changes of the subtitle font size, and Subtitle_style_change_mask indicating whether to allow changes of the subtitle style. When any one of these fields is set to "0," the changes are permitted. On the other hand, when it is set to "1," the changes are not permitted (prohibited). Therefore, an author could easily set various options for playing-back a subtitle by permitting or prohibiting users to change the position, font size, or style of a subtitle.

Figure 8B:
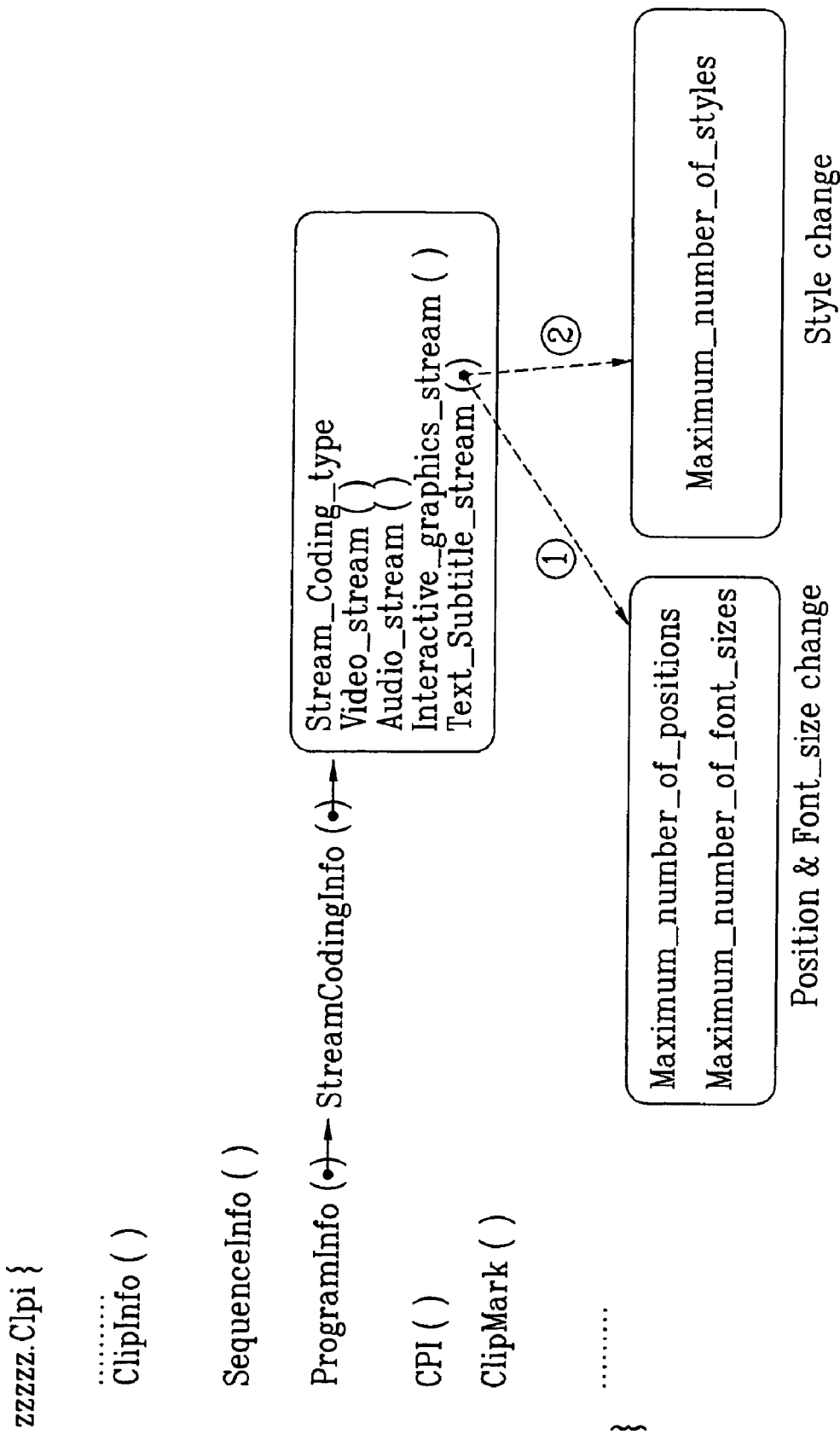
FIG. 8B illustrates the subtitle setting information stored in an optical disc according to the present invention.

FIG. 8B illustrates the subtitle setting information stored in a clip information file (*.clpi) according to the present invention. A clip information file includes property and timing information of a corresponding AV stream file, and it includes information such as ClipInfo ( ), Sequence Info ( ), ProgramInfo ( ), CPI ( ), ClipMark ( ), and etc. StreamCodingInfo ( ) included in ProgramInfo ( ) contains information indicating the coding type of the corresponding AV stream. Also, StreamCodingInfo ( ) also includes the subtitle setting information, examples of which are the maximum number of available subtitle positions (Maximum_number_of_positions), the maximum number of available subtitle font sizes (Maximum_number_of_font_sizes), and the maximum number of the user-selectable subtitle styles (Maximum_number_of_styles), all of which may be set by an author. Preferably, the maximum number of the user-selectable styles may be less than or equal to 25 due to the limited data storage space in an optical disc. Therefore, when a user makes a request for changing the subtitle setting into values that are not supported by these limitations, a warning message indicative of "out of supported range" could be provided or the setting could be set to values close to the supported values.

Figure 9:
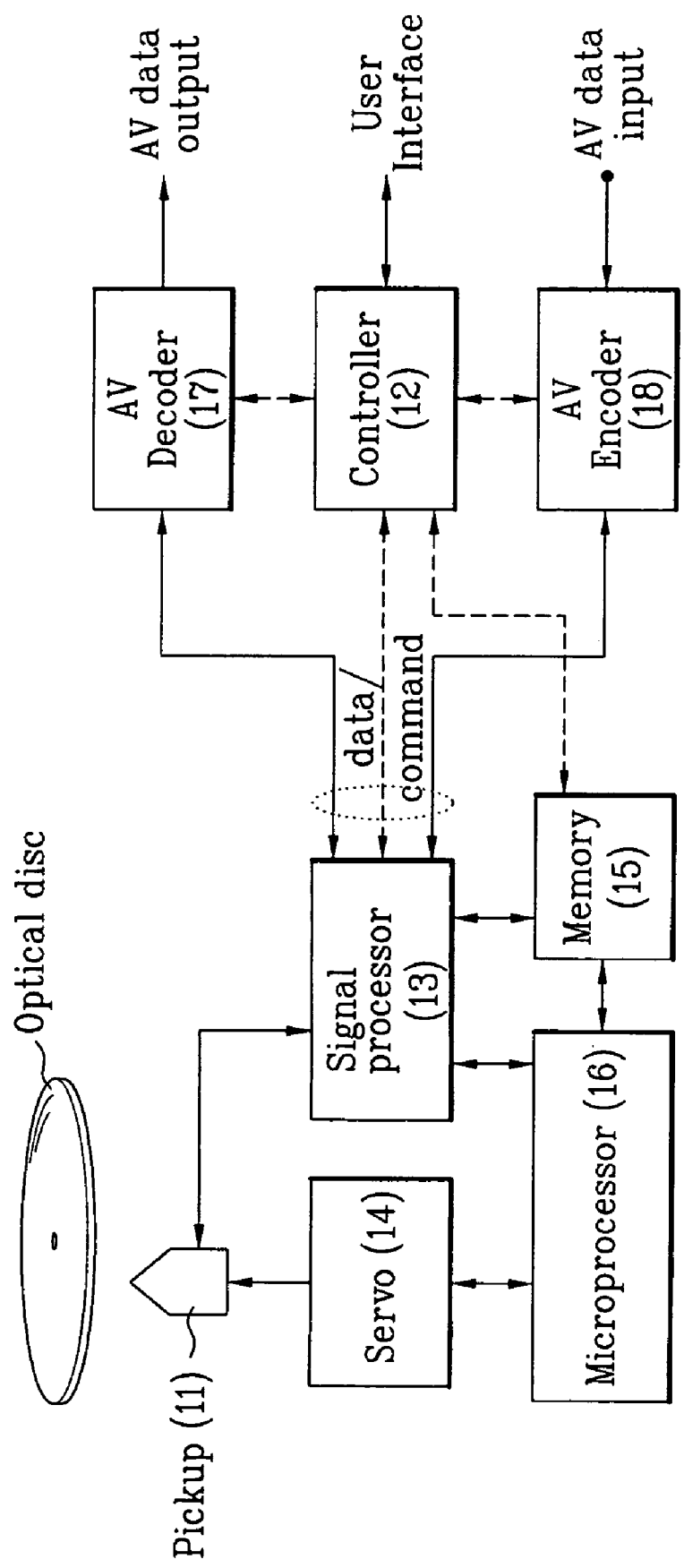
FIG. 9 illustrates an apparatus for recording and reproducing text subtitle streams according to the present invention.

FIG. 9 illustrates an optical disc player according to the present invention. The disc player shown in FIG. 9 includes a pickup unit 11 that reads AV stream data and subtitle setting data prerecorded in an optical disc, a servo 14 which controls operation of the pickup unit 11, a signal processor 13 which restores a signal received from the pickup unit 11 or modulates a signal into a recordable signal, a memory 15 which stores control information including the subtitle setting data, and a microprocessor 16 which control operations of the servo 14, the signal processor 13, and the memory 15.

In addition, the optical disc player further includes an AV decoder 17 that decodes the AV signal received from the signal processor 13, and an AV encoder 18 which converts an input AV signal into a certain signal, such as MPEG2 transport streams, and transmits the converted signal to the signal processor 13. In addition, the disc player further includes a controller 12, which basically controls operations of each unit included in the disc player. When a request for a change in the subtitle setting is made, the controller 12 determines whether the requested change is within the permitted setting ranges. For example, it determines whether a requested change in the position or font size of a subtitle is within the permitted ranges, or it determines whether such change is within an effective area of the display screen. The controller 12 changes the setting of a subtitle based on these determinations. In addition, the controller 12 also uses the user operation mask table (UO_mask_Table) information when determining whether a change in the subtitle setting for a particular playback time is permitted or prohibited.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A computer readable medium storing a data structure for managing reproduction by a reproduction device, comprising:
    a data area storing at least one text subtitle stream, the at least one text subtitle stream including text data for a text subtitle and style information, the style information including at least one user-selectable style, the at least one user-selectable style including a unique set of display properties required for displaying the text subtitle within a display screen; and
    an information area storing information files for managing reproduction of the at least one text subtitle stream by the reproduction device, wherein one of the at least one user-selectable style is applied to the text subtitle when a user operation to change a style of the text subtitle using the one of the at least one user-selectable style is permitted and is prohibited from being applied to the text subtitle when the user operation to change the style of the text subtitle using the one of the at least one user-selectable style is not permitted.

2. The computer readable medium of claim 1, wherein the unique set of display properties included in the at least one user-selectable style comprises at least one of a horizontal position, a vertical position, and a font size of the text subtitle.

3. The recording medium of claim 1, wherein the data area further stores audio-video (AV) streams, and wherein the at least one text subtitle stream is multiplexed with the AV streams.

4. The computer readable medium of claim 1, wherein the data area further stores audio-video (AV) streams, and wherein the at least one text subtitle stream exists as at least one independent stream file.

5. The computer readable medium of claim 1, wherein the at least one text subtitle stream further includes style information including a default style, and wherein the default style includes a set of display properties required for displaying the text subtitle by default.

6. The computer readable of claim 1,
    wherein the data area further stores a data field defining a maximum number of the at least one user-selectable style.

7. The computer readable medium of claim 1, wherein a maximum number of the at least one user-selectable style is less than or equal to 25.

8. A method of recording data streams for reproduction of a text subtitle on a recording medium, the method comprising:
    recording, by a controller, at least one text subtitle stream on the recording medium, the at least one text subtitle stream including text data for a text subtitle and style information, the style information including at least one user-selectable style, the at least one user-selectable style including a unique set of display properties required for displaying the text subtitle within a display screen, wherein one of the at least one user-selectable style is applied to the text subtitle when a user operation to change a style of the text subtitle using the one of the at least one user-selectable style is permitted and is prohibited from being applied to the text subtitle when the user operation to change the style of the text subtitle using the one of the at least one user-selectable style is not permitted.

9. The method of claim 8, wherein the unique set of display properties included in the at least one user-selectable style comprises at least one of a horizontal position, a vertical position, and a font size of the text subtitle.

10. The method of claim 8, wherein the at least one text subtitle stream further includes style information including a default style, wherein the default style includes a set of display properties required for displaying the at least one text subtitle by default.

11. The method of claim 8 further comprising:
    recording a data field defining a maximum number of the at least one user-selectable style.

12. The method of claim 8, wherein a maximum number of the at least one user-selectable style is less than or equal to 25.

13. A method of recording data streams for reproduction of a text subtitle on a recording medium, the method comprising:
    recording, by a controller, at least one text subtitle stream and audio-video (AV) stream as an independent and separate stream file from each other on the recording medium, the at least one text subtitle stream including text data for a text subtitle and style information, the style information including at least one user-selectable style, the at least one user-selectable style including a unique set of display properties required for displaying the text subtitle within a display screen;
    recording, by the controller, the data streams on the recording medium, wherein one of the at least one user-selectable style is applied to the text subtitle when a user operation to change a style of the text subtitle using the one of the at least one user-selectable style is permitted and is prohibited from being applied to the text subtitle when the user operation to change the style of the text subtitle using the one of the at least one user-selectable style is not permitted.

14. A method of reproducing data streams for reproduction of a text subtitle recorded on a recording medium, the method comprising:
    reading, by a pickup, at least one text subtitle stream from the recording medium, the at least one text subtitle stream including text data for a text subtitle and style information, the style information including at least one user-selectable style, the at least one user-selectable style including a unique set of display properties required for displaying the text subtitle within a display screen; and
    displaying, by a controller, the text subtitle using the style information, wherein
        one of the at least one user-selectable style is applied to the text subtitle when a user operation to change a style of the text subtitle using the one of the at least one user-selectable style is permitted and is prohibited from being applied to the text subtitle when the user operation to change the style of the text subtitle using the one of the at least one user-selectable style is not permitted.

15. The method of claim 14, further comprising:
each time a request for changing display properties of the text subtitle is made, changing the display properties between the at least one user-selectable styles in a predetermined order.

16. The method of claim 14, wherein the unique set of display properties included in the at least one user-selectable style comprises at least one of a horizontal position, a vertical position, and a font size of the text subtitle.

17. The method of claim 14 further comprising:
reading a data field defining a maximum number of the at least one user-selectable style.

18. The method of claim 14, wherein a maximum number of the at least one user-selectable style is less than or equal to 25.

19. An apparatus for recording data for reproduction of a text subtitle on a recording medium, the apparatus comprising:
a recording unit configured to record data on the recording medium; and
a controller, operatively coupled to the recording unit, configured to control the recording unit to record at least one text subtitle stream, the at least one text subtitle stream including text data for a text subtitle and style information, the style information including at least one user-selectable style, the at least one user-selectable style including a unique set of display properties required for displaying the text subtitle within a display screen, wherein one of the at least one user-selectable style is applied to the text subtitle when a user operation to change a style of the text subtitle using the one of the at least one user-selectable style is permitted and is prohibited from being applied to the text subtitle when the user operation to change the style of the text subtitle using the one of the at least one user-selectable style is not permitted.

20. The apparatus of claim 19, wherein the controller is further configured to control the recording unit to record audio-video (AV) streams multiplexed with the at least one text subtitle stream.

21. The apparatus of claim 19, wherein the controller is further configured to control the recording unit to record audio-video (AV) streams separate from the at least one text subtitle stream.

22. The apparatus of claim 19, wherein the at least one text subtitle stream further includes style information including a default style, the default style includes a set of display properties required for displaying the text subtitle within the display screen by default.

23. The apparatus of claim 19, wherein the controller is further configured to control the recording unit to record information defining a maximum number of the at least one user-selectable style.

24. The apparatus of claim 19, wherein the at least one text subtitle stream further includes style information including a default style, and wherein the default style includes a set of display properties required for displaying the text subtitle within the display screen by default.

25. The apparatus of claim 19, wherein the recording unit comprises a pickup.

26. A method of reproducing data streams for reproduction of a text subtitle recorded on a recording medium, the method comprising:
reading, by a pickup, at least one text subtitle stream from the recording medium, the at least one text subtitle stream including text data for a text subtitle and style information, the style information including a default style and at least one user-selectable style, the at least one user-selectable style including a unique set of display properties required for displaying the text subtitle within a display screen;
displaying, by a controller, the text subtitle using the style information, one of the at least one user-selectable style being applied to the text subtitle when a user operation to change a style of the text subtitle using the one of the at least one user-selectable style is permitted and is prohibited from being applied to the text subtitle when the user operation to change the style of the text subtitle using the one of the at least one user-selectable style in not permitted;
initially setting, by a controller, display properties of the text subtitle within the display screen to the default style; and
receiving, by a controller, a command selecting the one of the at least one user-selectable style from a user.

27. The method of claim 26, wherein the unique set of display properties included in the at least one user-selectable style comprises at least one of a horizontal position, a vertical position, and a font size of the text subtitle.

28. An apparatus for reproducing data recorded on a recording medium, the apparatus comprising:
a reproducing unit configured to reproduce data recorded on the recording medium; and
a controller, operatively coupled to the reproducing unit, configured to control reproducing of at least one text subtitle stream, the at least one text subtitle stream including text data for a text subtitle and style information, the style information including at least one user-selectable style, the at least one user-selectable style including a unique set of display properties required for displaying the text subtitle within a display screen, the text subtitle being displayed based on the style information, wherein
one of the at least one user-selectable style is applied to the text subtitle when a user operation to change a style of the text subtitle using the one of the at least one user-selectable style is permitted and is prohibited from being applied to the text subtitle when the user operation to change the style of the text subtitle using the one of the at least one user-selectable style is not permitted.

29. The apparatus of claim 28, wherein the controller is further configured to control the reproducing unit to reproduce audio-video (AV) streams multiplexed with the at least one. text subtitle stream.

30. The apparatus of claim 28, wherein the controller is further configured to control the reproducing unit to reproduce audio-video (AV) streams separate from the at least one text subtitle stream.

31. The apparatus of claim 28, wherein the at least one text subtitle stream further includes style information including a default style, the default style includes a set of display properties required for displaying the text subtitle by default.

32. The apparatus of claim 28, wherein the controller is further configured to control the reproducing unit to reproduce information defining a maximum number of the at least one user-selectable style.

33. The apparatus of claim 28, wherein the reproducing unit comprises a pickup.

* * * * *